(12) United States Patent
Kamimae

(10) Patent No.: US 8,177,290 B2
(45) Date of Patent: May 15, 2012

(54) CAB REINFORCEMENT STRUCTURE AND WORK MACHINE CAB

(75) Inventor: Takeshi Kamimae, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/079,149

(22) Filed: Mar. 25, 2008

(65) Prior Publication Data

US 2008/0238144 A1   Oct. 2, 2008

(30) Foreign Application Priority Data

Mar. 26, 2007   (JP) .................................. 2007-079688

(51) Int. Cl.
*B62D 33/077*   (2006.01)
(52) U.S. Cl. .................... 296/190.08; 52/283; 296/29
(58) Field of Classification Search .............. 296/29, 296/30, 190.01, 203.03, 190.07, 187.08, 296/193.06; 52/251, 272, 283
See application file for complete search history.

(56) References Cited

U.S. PATENT DOCUMENTS

| | | | | |
|---|---|---|---|---|
| 1,588,268 A | * | 6/1926 | Roche | 403/171 |
| 1,729,663 A | * | 10/1929 | Martin | 296/30 |
| 1,828,743 A | * | 10/1931 | Lovell | 296/203.01 |
| 2,007,255 A | * | 7/1935 | Rohr | 296/193.06 |
| 2,009,614 A | * | 7/1935 | Geyer | 296/30 |
| 4,135,756 A | * | 1/1979 | Hausmann | 296/190.03 |
| 4,136,985 A | * | 1/1979 | Taul | 403/172 |
| 4,462,629 A | * | 7/1984 | Todori et al. | 296/30 |
| 4,650,242 A | * | 3/1987 | Obe et al. | 296/190.08 |
| 5,116,161 A | * | 5/1992 | Faisst | 403/231 |
| 6,032,980 A | * | 3/2000 | Rapp et al. | 280/756 |
| 6,209,949 B1 | | 4/2001 | Sakyo et al. | |
| 6,409,254 B2 | * | 6/2002 | Tiziano | 296/190.08 |
| 6,619,631 B2 | * | 9/2003 | Painter | 256/65.01 |
| 6,695,389 B2 | * | 2/2004 | Streiff et al. | 296/178 |
| 7,407,222 B2 | * | 8/2008 | Anderson et al. | 296/193.06 |
| 2007/0007054 A1 | * | 1/2007 | Nakashima et al. | 180/65.1 |
| 2007/0063543 A1 | * | 3/2007 | Roccato et al. | 296/187.08 |

FOREIGN PATENT DOCUMENTS

| | | |
|---|---|---|
| JP | 9-123943 A | 5/1997 |
| JP | 11-166247 A | 6/1999 |
| JP | 2001-260951 A | 9/2001 |
| JP | 2002-161551 A | 6/2002 |
| JP | 2004-338686 A | 12/2004 |

OTHER PUBLICATIONS

Japanese Office Action dated Oct. 11, 2011 (and English translation thereof) in counterpart Japanese Application No. 2007-079688.

* cited by examiner

*Primary Examiner* — Glenn Dayoan
*Assistant Examiner* — Pinel Romain
(74) *Attorney, Agent, or Firm* — Holtz, Holtz, Goodman & Chick, PC

(57) ABSTRACT

A cab reinforcement structure for reinforcing a cab by a gusset disposed in a corner at which a right rear pillar and a hollow rear lateral beam member joined to the right rear pillar meet each other is formed such that a gusset retaining member for sustaining a load from a gusset side is disposed within the rear lateral beam member in relation to the rear lateral beam member side end of the gusset and the gusset retaining member is composed of a plate-like member for blocking up the inside of the rear lateral beam member at a position corresponding to the rear lateral beam member side end of the gusset.

3 Claims, 14 Drawing Sheets

FIG. 4
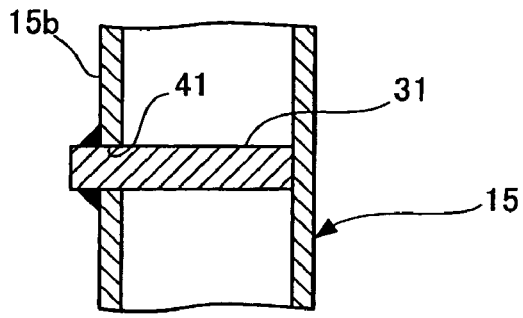
4 (b)
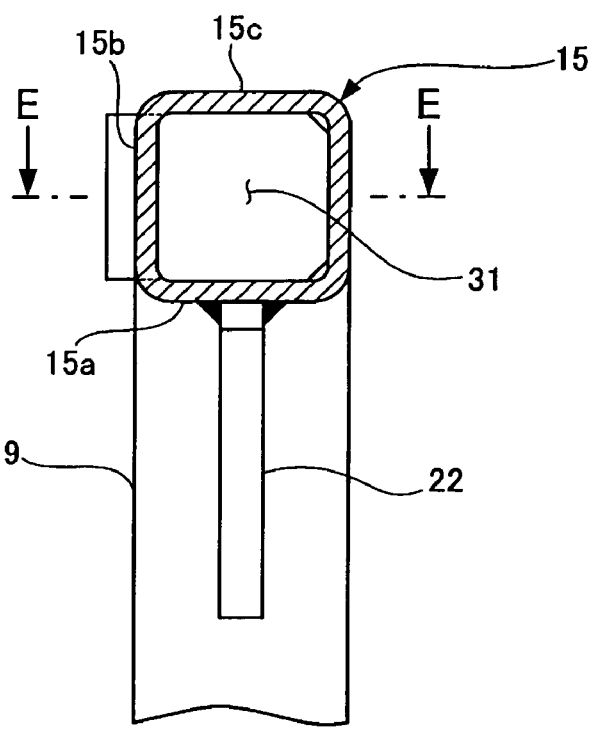
4 (a)
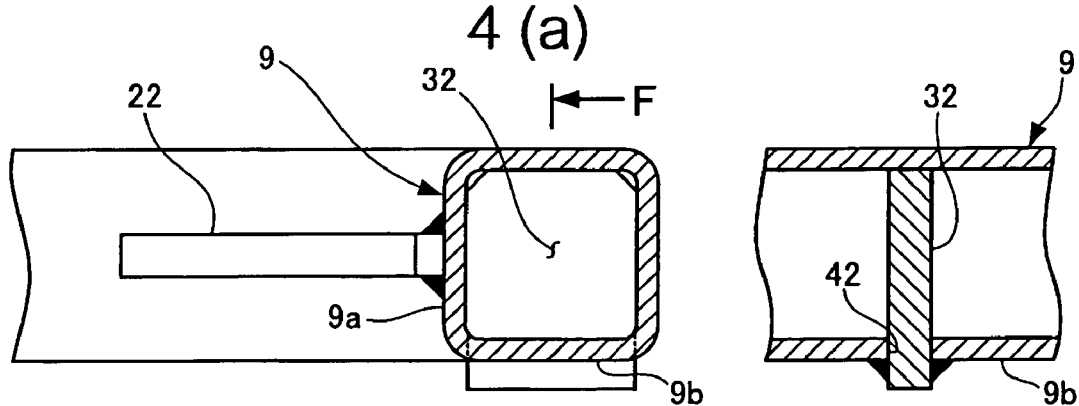
4 (c)    4 (d)

FIG. 5
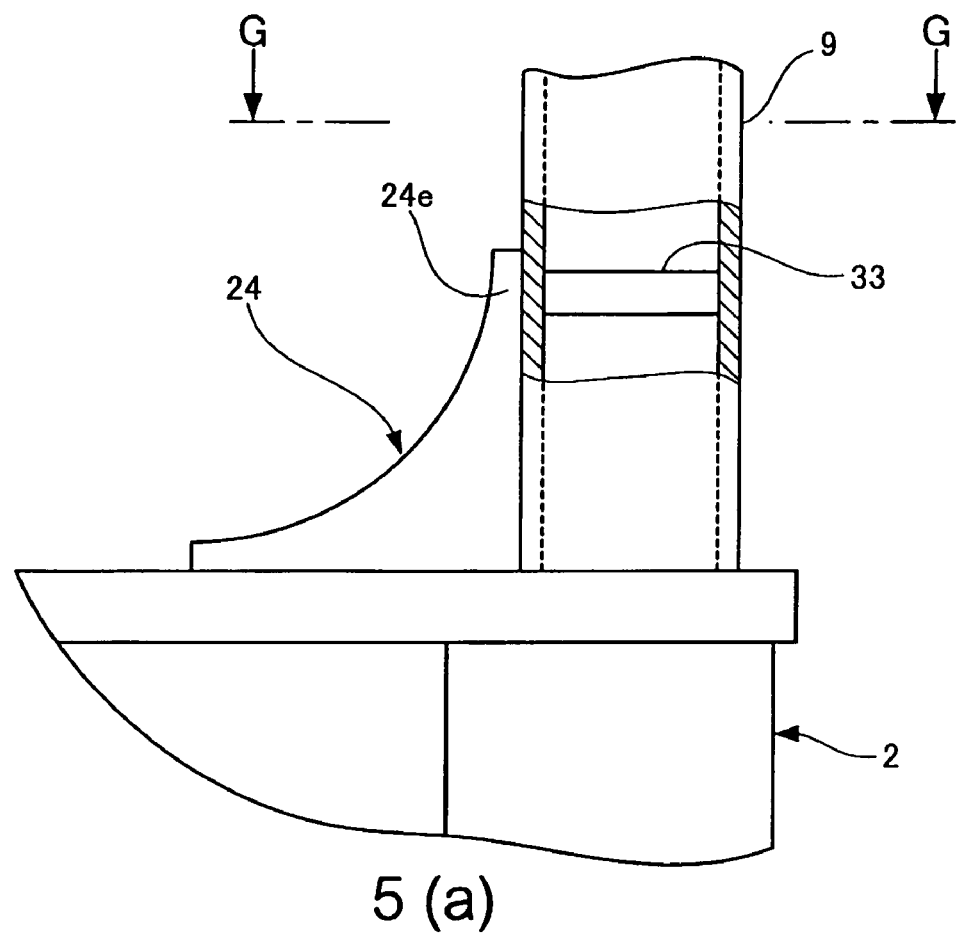
5 (a)
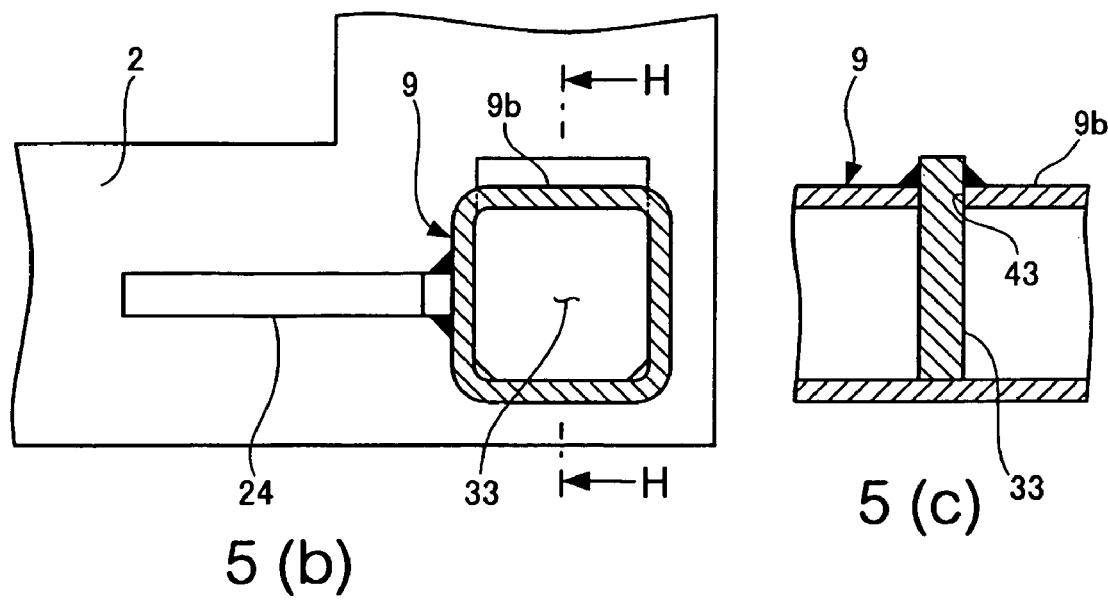
5 (b)
5 (c)

FIG. 6
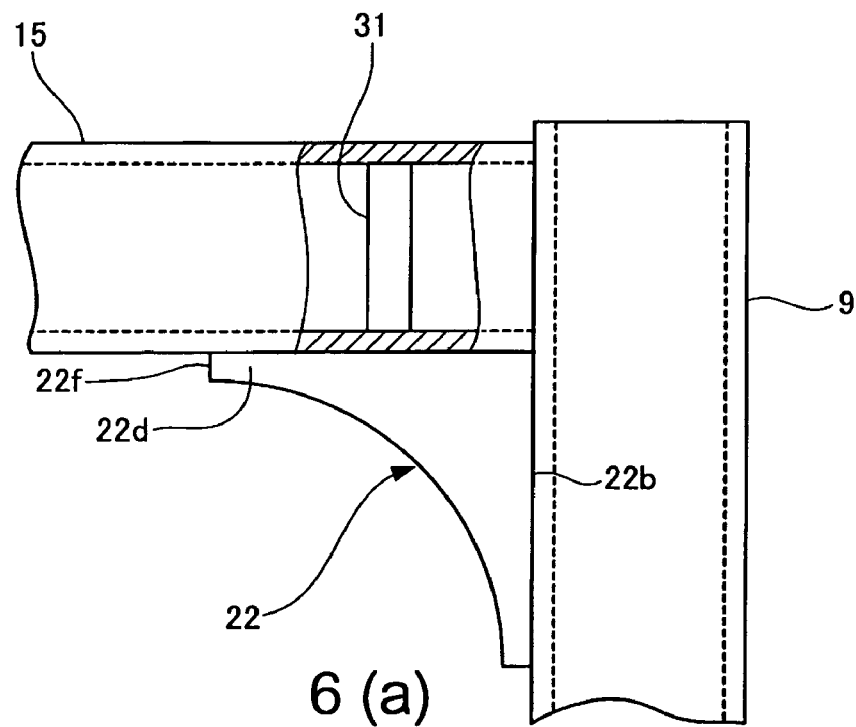
6 (a)
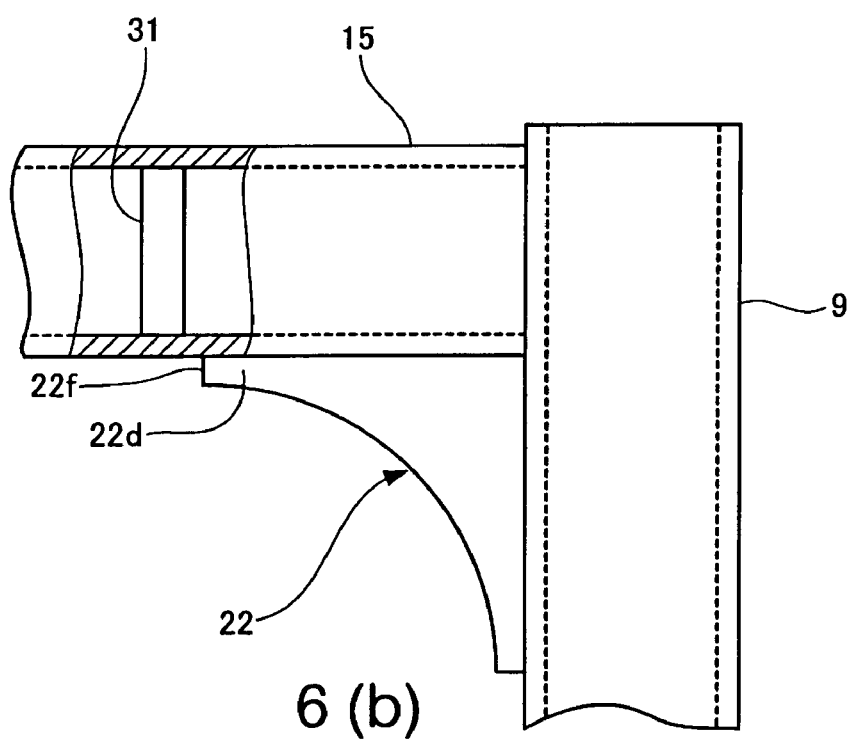
6 (b)

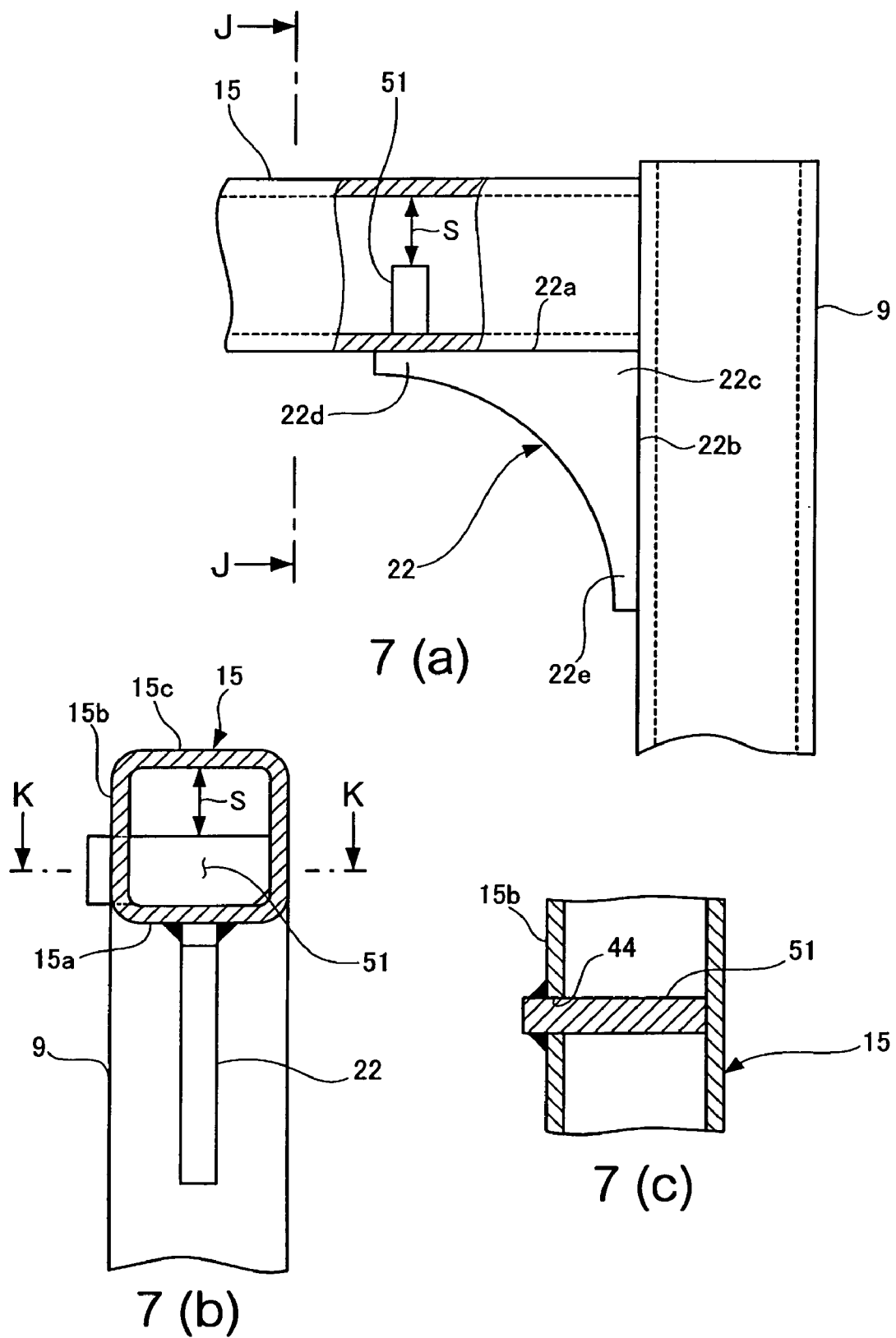

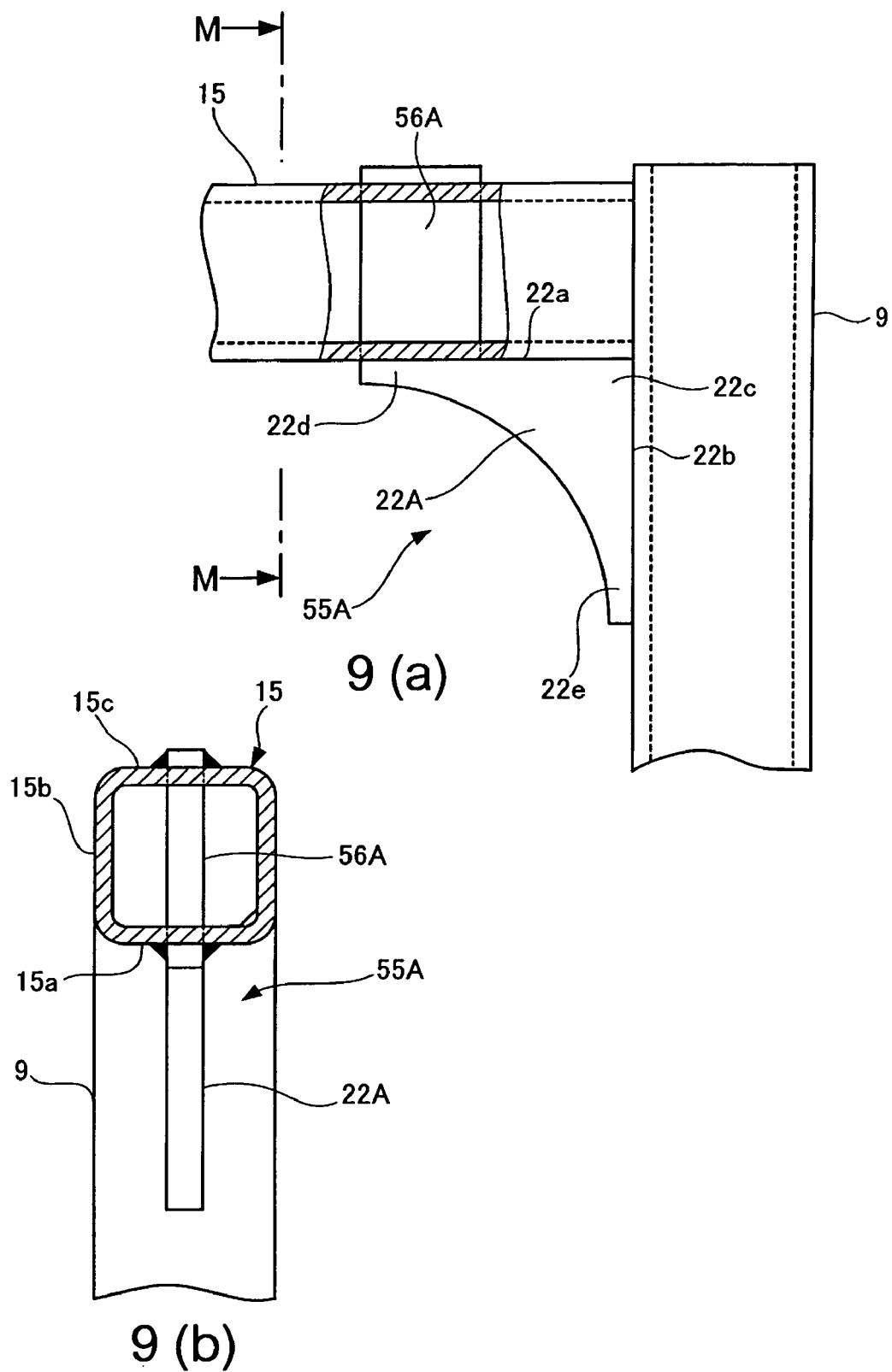

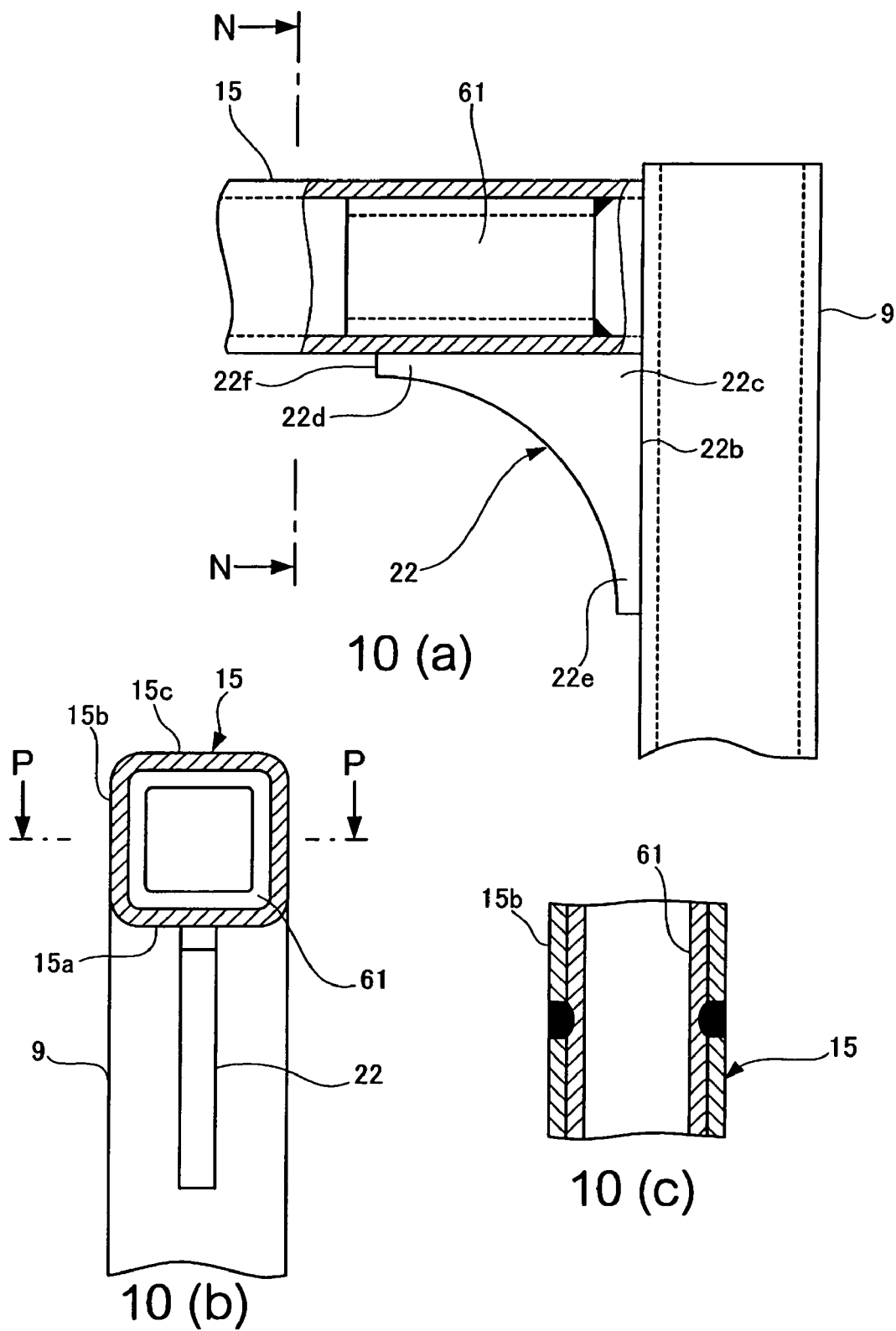

FIG. 14   PRIOR ART
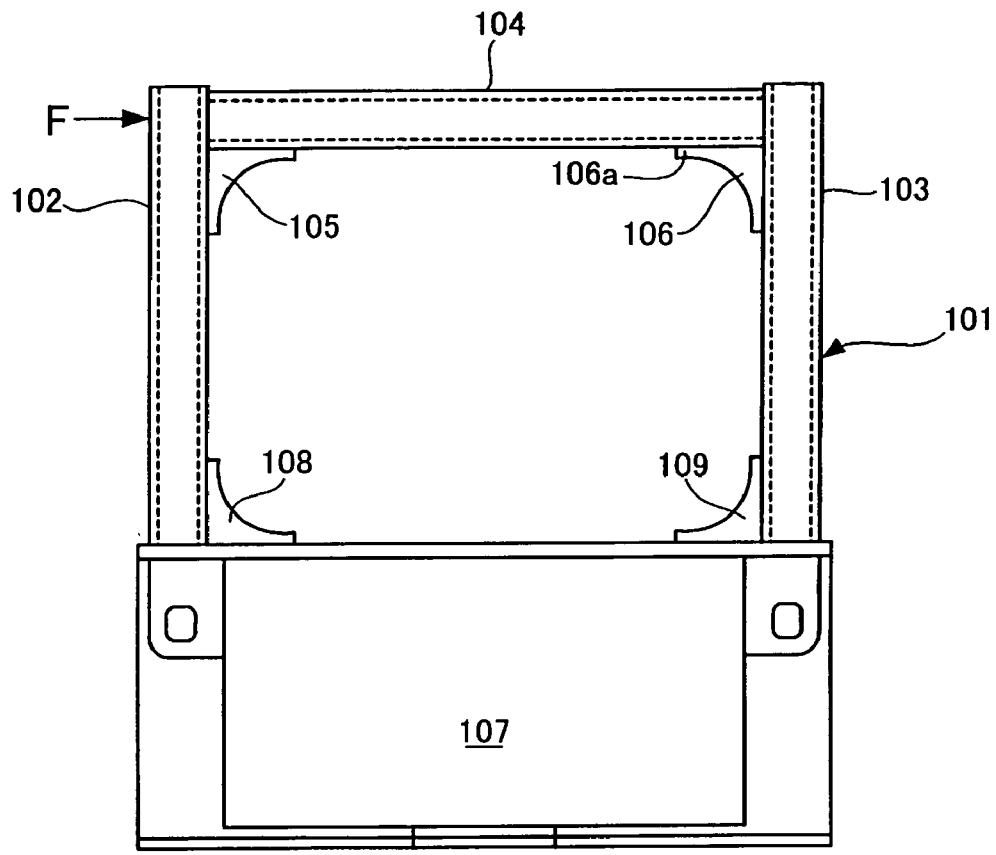
14 (a)
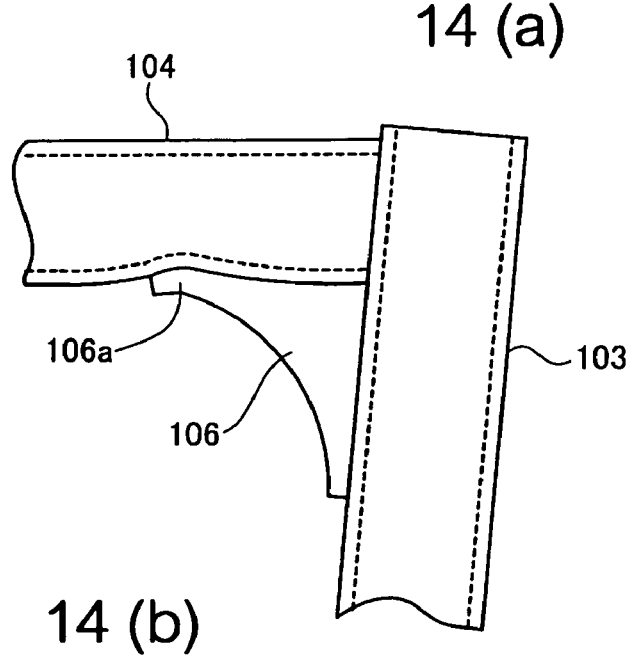
14 (b)
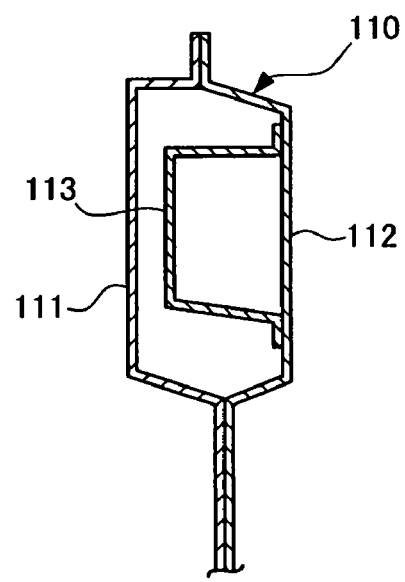
14 (c)

CAB REINFORCEMENT STRUCTURE AND WORK MACHINE CAB

TECHNICAL FIELD

The present invention relates to a cab reinforcement structure for reinforcing an operator's cab mounted on a work machine such as bulldozers by means of a gusset and to a work machine cab.

BACKGROUND ART

In a cab mounted on a bulldozer for instance, a cab body is integrally mounted on a floor frame. The cab body includes right and left front pillars that stand upright on the front end of the floor frame; right and left center pillars that stand upright on the longitudinally intermediate part of the floor frame; and right and left rear pillars that stand upright on the read end of the floor frame. These pillars are connected to one another at the upper ends thereof with desired beam members that are disposed on the top of the cab body so as to extend in longitudinal, lateral and diagonal directions. Herein, the pillars (support column members) and the beam members are each composed of a pipe member having a square cross-section.

As illustrated in FIG. 14(a), in a cab body 101, a gusset 105 (i.e., a plate for strengthening an angle in framework) is joined at the corner where a left rear pillar 102 and a beam member 104 meet at substantially right angles and a gusset 106 is joined at the corner where a right rear pillar 103 and the beam member 104 meet at substantially right angles. The beam member 104 connects the upper ends of the rear pillars 102, 103 to each other and is hereinafter referred to as "rear lateral beam member 104". Likewise, gussets 108, 109 are joined at the respective corners where the left rear pillar 102 and the right rear pillar 103 respectively meet a floor frame 107 at substantially right angles. The gussets 105, 106, 108, 109 are each composed of a relatively-thick, plate-like material.

If a lateral load F is imposed on the top of the cab body 101 from the left side, the left rear pillar 102 will tilt to the right while the right rear pillar 103 will be pushed by the rear lateral beam member 104, tilting to the right, so that deformation will occur so as to reduce the angle between the rear lateral beam member 104 and the right rear pillar 103. At that time, the gusset 106 functions as a reinforcement member for restraining the deformation. Such reinforcement by use of gussets is commonly practiced and one example of it is disclosed in JP-A-2004-338686.

When the lateral load F is imposed on the top part of the cab body 101, it causes a load acting on the rear lateral beam member 104 from the gusset 106 side so as to crush the rear lateral beam member 104. This load concentrates upon a position of the rear lateral beam member 104 that corresponds to a rear lateral beam member side end 106a of the gusset 106. In the conventional cab reinforcement structure having the gusset 106, the concentrated load is received by the rear lateral beam member 104 composed of a pipe member and therefore the gusset 106 thrusts into the rear lateral beam member 104 as illustrated in FIG. 14(b), which presents the problem that the satisfactory reinforcing effect of the gusset 106 cannot be obtained. Thrust-in similar to the above-described thrust-in of the gusset 106 resulting from the action of the lateral load F possibly occurs between the right rear pillar 103 and the gusset 106 and between the left rear pillar 102 and the gusset 108. In cases where the upper peripheral edge of the floor frame 107 is composed of a pipe member, similar thrust-in may occur between this pipe member and the gusset 108.

The above problem may be solved by reinforcing the hollow support column members or hollow beam member to which a gusset is joined. A prior technique of such reinforcement is proposed, for instance, in JP-A-11-166247 (Patent Document 2). According to Patent Document 2, a hollow pillar 110 composed of an inner plate 111 and an outer plate 112 which are joined to each other is provided with a vertical reinforcement member 113 as shown in FIG. 14(c). The vertical reinforcement member 113 is inserted in the hollow pillar 110 so as to partition its inner space and has the shape of "]" (square bracket) in cross-section.

The vertical reinforcement member 113 used for strengthening the hollow pillar 110 in the technique of Patent Document 2, however, fails to function as a reinforcement member capable of sustaining a load that is imposed on the hollow pillar 110 so as to locally crush it, although it effectively functions as a reinforcement member capable of effectively resisting a bending load imposed on the hollow pillar 110. Therefore, the above problem will not be solved even if the technique disclosed in Patent Document 2 is applied to the above-described cab reinforcement structure having gussets.

The invention is directed to overcoming the above problem and a first object of the invention is therefore to provide a cab reinforcement structure and a work machine cab which are capable of preventing a gusset provided between a support column member and a hollow beam member from thrusting into the beam member. A second object of the invention is to provide a cab reinforcement structure and a work machine cab which are capable of preventing a gusset provided between a hollow support column member and a beam member from thrusting into the support column member. A third object of the invention is to provide a cab reinforcement structure and a work machine cab which are capable of preventing a gusset provided between a floor frame and a hollow support column member from thrusting into the support column member. A fourth object of the invention is to provide a cab reinforcement structure and a work machine cab which are capable of preventing a gusset provided between a pipe member constituting a floor frame and a support column member from thrusting into the pipe member.

SUMMARY OF THE INVENTION

The first object of the invention can be accomplished by a cab reinforcement structure of the invention for reinforcing a cab by a gusset disposed in a corner at which a support column member and a hollow beam member joined to the support column member meet each other, the structure comprising:

a gusset retaining member that is disposed within the beam member in relation to the gusset, for sustaining a load from a gusset side (a first aspect of the invention).

The gusset retaining member of the first aspect is preferably composed of a plate-like member for blocking up the inside of the beam member at a position corresponding to an end of the gusset (a second aspect of the invention).

The second object of the invention can be accomplished by a cab reinforcement structure of the invention for reinforcing a cab by a gusset disposed in a corner at which a hollow support column member and a beam member joined to the support column member meet each other, the structure comprising:

a gusset retaining member that is disposed within the support column member in relation to the gusset, for sustaining a load from a gusset side (a third aspect of the invention).

The gusset retaining member of the third aspect is preferably composed of a plate-like member for blocking up the inside of the support column member at a position corresponding to an end of the gusset (a fourth aspect of the invention).

The third object of the invention can be accomplished by a cab reinforcement structure of the invention for reinforcing a cab by a gusset disposed in a corner at which a floor frame and a hollow support column member standing upright on the floor frame meet each other, the structure comprising:

a gusset retaining member that is disposed within the support column member in relation to the gusset, for sustaining a load from a gusset side (a fifth aspect of the invention).

The gusset retaining member of the fifth aspect is preferably composed of a plate-like member for blocking up the inside of the support column member at a position corresponding to an end of the gusset (a sixth aspect of the invention).

The fourth object of the invention can be accomplished by a cab reinforcement structure of the invention for reinforcing a cab by a gusset disposed in a corner at which a pipe member constituting a floor frame and a support column member standing upright on the pipe member meet each other, the structure comprising:

a gusset retaining member that is disposed within the pipe member in relation to the gusset, for sustaining a load from a gusset side (a seventh aspect of the invention).

The gusset retaining member of the seventh aspect is preferably composed of a plate-like member for blocking up the inside of the pipe member at a position corresponding to an end of the gusset (an eighth aspect of the invention).

There is provided, according to a ninth aspect of the invention, a work machine cab having any one of the cab reinforcement structures of the first to eighth aspects.

According to the first aspect, if a load is imposed on the beam member from the gusset side so as to crush the beam member, the load will be sustained by the gusset retaining member, thereby preventing thrust of the gusset into the beam member.

According to the third and fifth aspects, if a load is imposed on the support column member from the gusset side so as to crush the support column member, the load will be sustained by the gusset retaining member, thereby preventing thrust of the gusset into the support column member.

According to the seventh aspect, if a load is imposed on the pipe member constituting the floor frame from the gusset side so as to crush the pipe member, the load will be sustained by the gusset retaining member, thereby preventing thrust of the gusset into the pipe member.

Incidentally, the load, which acts upon the beam member, the support column member or the pipe member constituting the floor frame (which are hereinafter referred to as "beam member or the like") from the gusset side so as to crush it when a lateral load is imposed on the cab, concentrates in a position of the beam member or the like that corresponds to an end of the gusset. This concentrated load can be securely sustained by the gusset retaining member by making the gusset retaining member from a plate-like member that blocks up the inside of the beam member or the like at the position corresponding to the end of the gusset. Accordingly, thrust of the gusset into the beam member or the like can be prevented without fail.

BRIEF DESCRIPTION OF DRAWINGS

FIG. 4(a) is a sectional view taken along line C-C of FIG. 3, FIG. 4(b) is a sectional view taken along line E-E of FIG. 4(a), FIG. 4(c) is a sectional view taken along line D-D of FIG. 3, and FIG. 4(d) is a sectional view taken along line F-F of FIG. 4(c).

FIG. 5(a) is a partly broken enlarged view showing Part B of FIG. 2, FIG. 5(b) is a sectional view taken along line G-G of FIG. 5(a), and FIG. 5(c) is a sectional view taken along line H-H of FIG. 5(b).

FIG. 6(a) is an explanatory view of Modification 1 of the first embodiment and FIG. 6(b) is an explanatory view of Modification 2 of the first embodiment.

FIG. 7 shows explanatory views of a cab reinforcement structure according to a second embodiment of the invention, wherein FIG. 7(a) is a partly broken enlarged view of the upper right corner of a cab as viewed from the rear face side thereof, FIG. 7(b) is a sectional view taken along line J-J of FIG. 7(a), and FIG. 7(c) is a sectional view taken along line K-K of FIG. 7(b).

FIG. 8 shows explanatory views of a cab reinforcement structure according to a third embodiment of the invention, wherein

FIG. 9 shows explanatory views of a modification of the third embodiment, wherein FIG. 9(a) is a partly broken enlarged view of the upper right corner of a cab as viewed from the rear face side thereof and FIG. 9(b) is a sectional view taken along line M-M of FIG. 9(a).

FIG. 10 shows explanatory views of a cab reinforcement structure according to a fourth embodiment of the invention, wherein FIG. 10(a) is a partly broken enlarged view of the upper right corner of a cab as viewed from the rear face side thereof, FIG. 10(b) is a sectional view taken along line N-N of FIG. 10(a), and FIG. 10(c) is a sectional view taken along line P-P of FIG. 10(b).

FIG. 13(a) is a partly broken enlarged view of the upper right corner of a cab as viewed from the rear face side thereof, FIG. 13(b) is a sectional view taken along line Q-Q of FIG. 13(a)

FIG. 14 is an explanatory view of a prior art technique.

DETAILED DESCRIPTION OF THE INVENTION

Referring now to the accompanying drawings, the cab reinforcement structure and work machine cab of the invention will be described according to preferred embodiments of the invention. Although the invention is applied to a cab mounted on a bulldozer in the following embodiments, it is apparent that the invention is not necessarily limited to the embodiments disclosed herein but is applicable to cabs mounted on other work machines such as hydraulic excavators and wheel loaders.

First Embodiment

Figure 1:
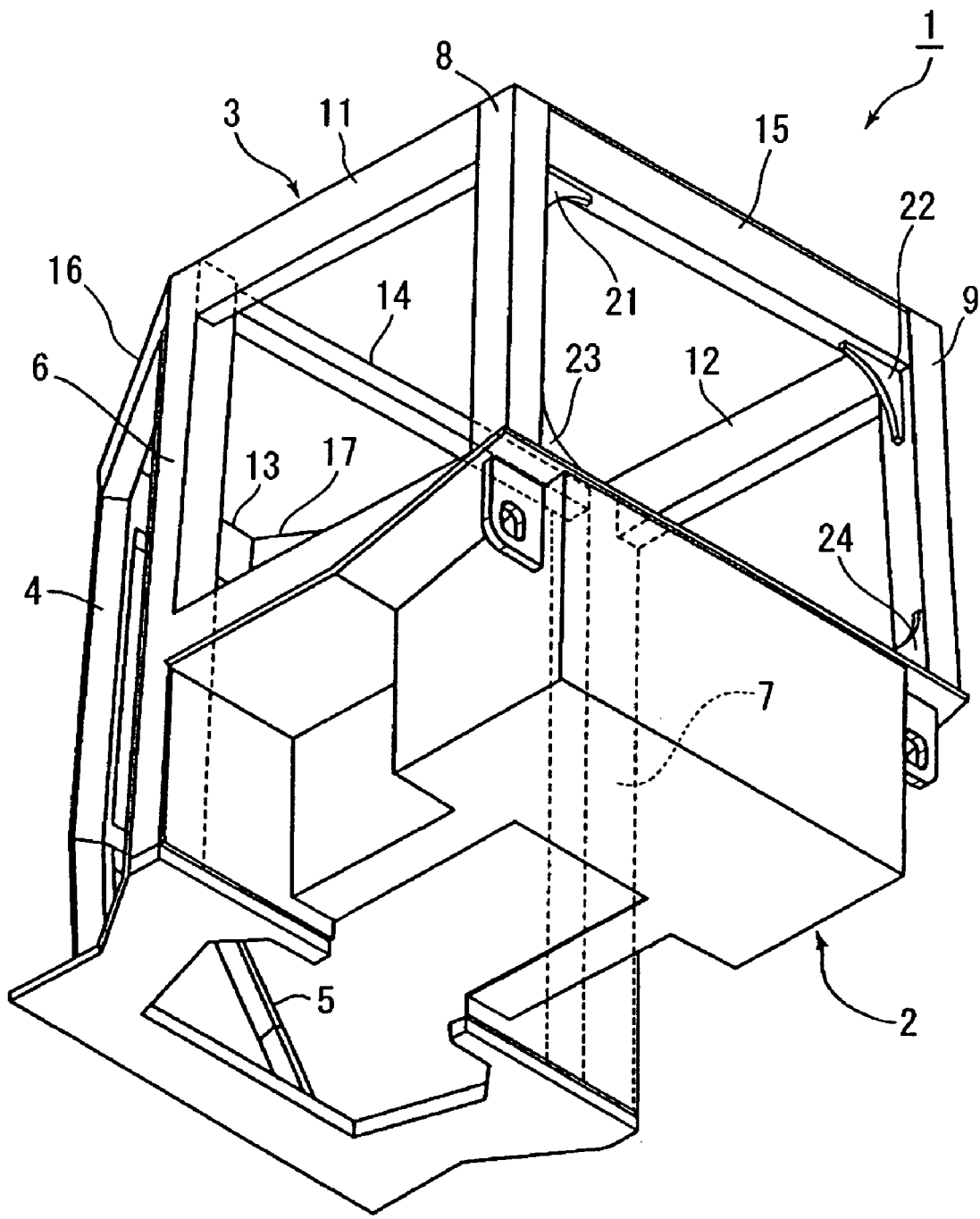
FIG. 1 is a perspective view of a rear face of a cab having a cab reinforcement structure according to a first embodiment of the invention, when viewed from the bottom left.

FIG. 1 is a perspective view of a rear face of a cab having a cab reinforcement structure according to a first embodiment of the invention, when viewed from the bottom left.

FIG. 1 shows a cab 1 wherein a cab body 3 is integrally mounted on a floor frame 2 having a sheet-metal box structure. The cab 1 is trapezoidal and tapered down toward its front part when viewed from above and rectangular when viewed from the rear, so that the cab 1 takes the form of a truncated hexagonal pyramid as a whole.

The cab body 3 has left and right front pillars 4, 5 that stand upright on the front end of the floor frame 2; left and right center pillars 6, 7 that stand upright on the longitudinally intermediate part of the floor frame 2; and left and right rear pillars 8, 9 that stand upright on the rear end of the floor frame 2. The upper ends of these pillars 4 to 9 are connected to one another by desired beam members 11, 12, 13, 14, 15, 16, 17 that are disposed on the top of the cab body 3 so as to extend in longitudinal, lateral and diagonal directions respectively. Herein, these pillars (support column members) 4 to 9 and beam members 11 to 17 are each composed of a tubular pipe member having a rectangular cross-section.

Figure 2:
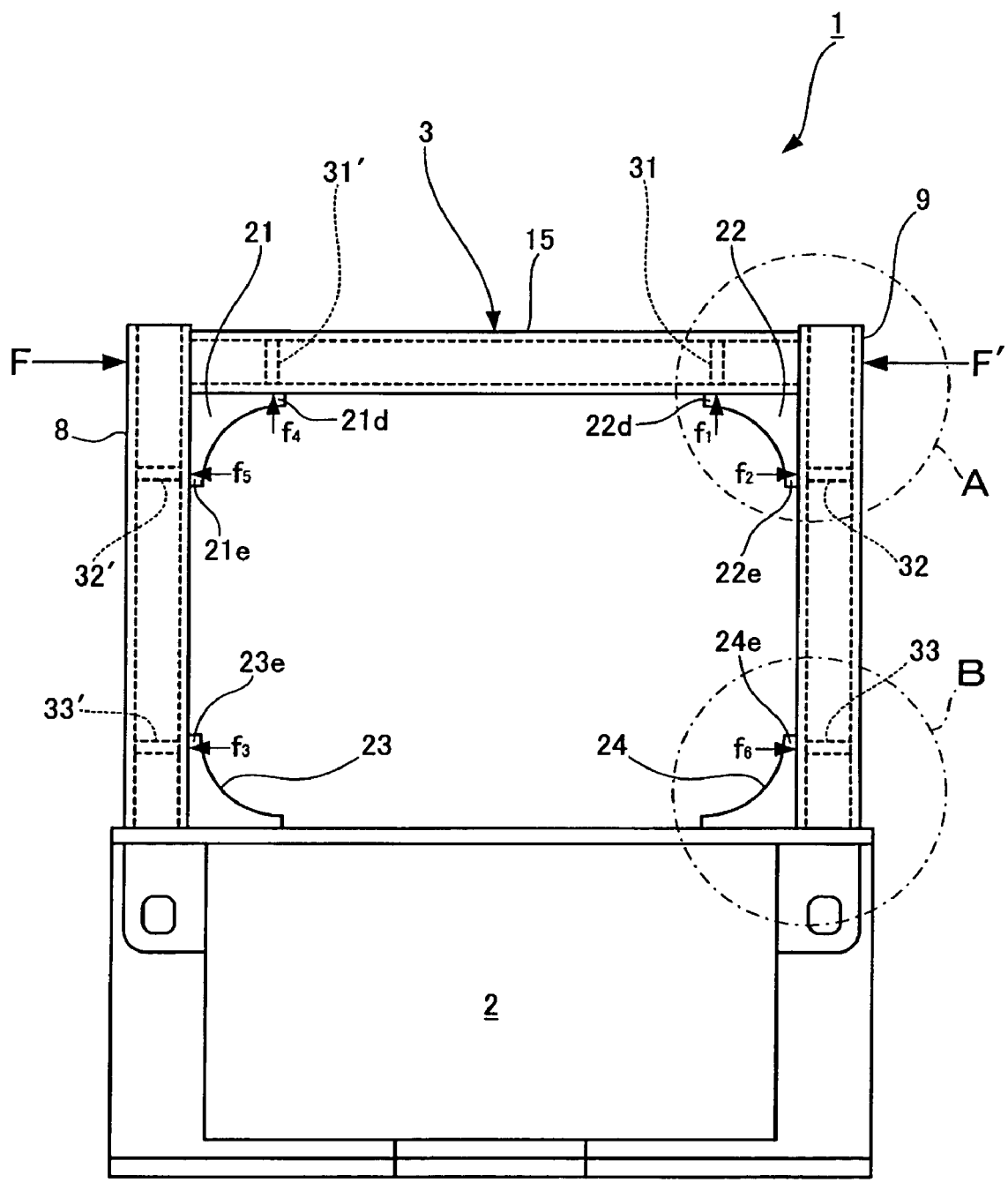
FIG. 2 is a rear view of the cab having the cab reinforcement structure according to the first embodiment.
Figure 3:
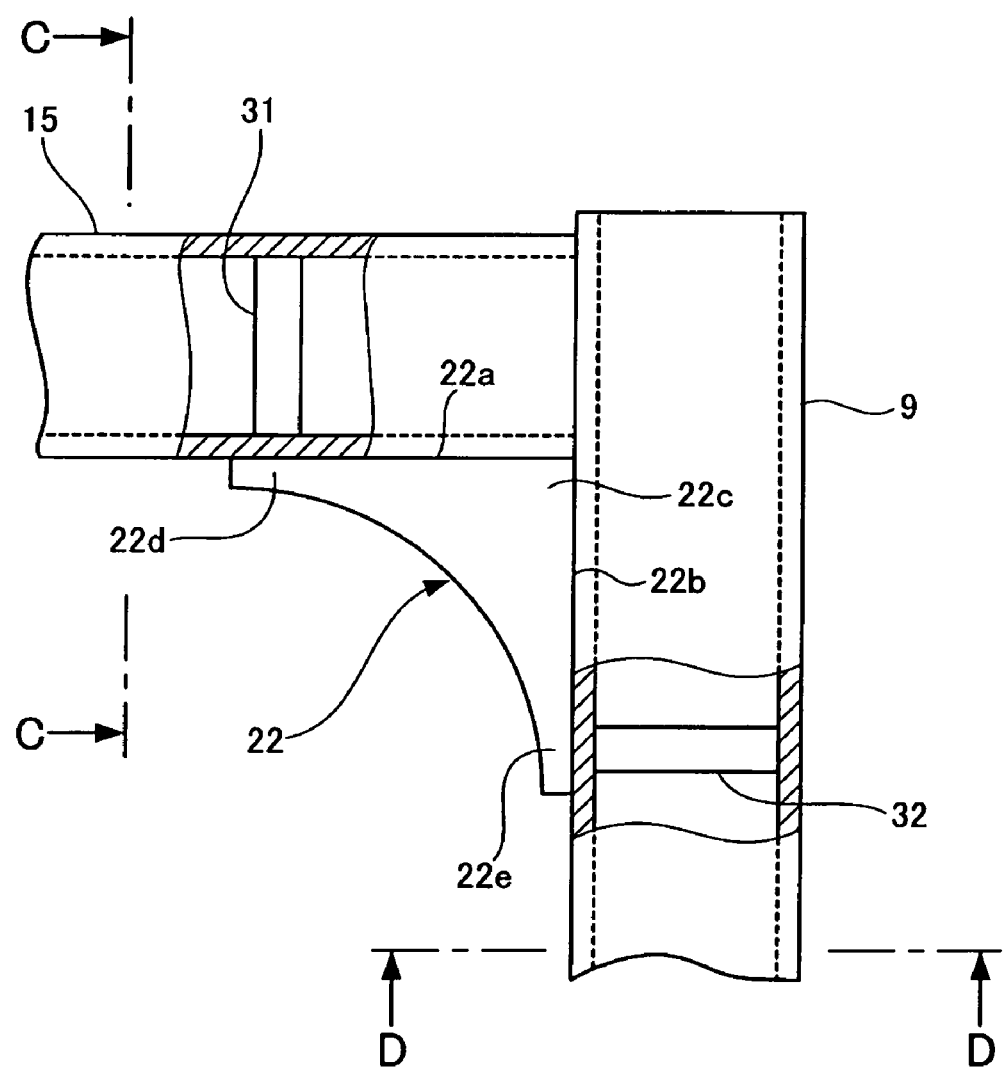
FIG. 3 is a partly broken enlarged view showing Part A of FIG. 2.

As illustrated in FIG. 2, in the cab body 3, a gusset 21 (i.e., a plate for strengthening an angle in framework) is joined at the corner where a left rear pillar 8 and the beam member 15 meet at substantially right angles whereas a gusset 22 is joined at the corner where a right rear pillar 9 and the beam member 15 meet at substantially right angles. The beam member 15 connects the upper ends of the rear pillars 8, 9 to each other and is hereinafter referred to as "rear lateral beam member 15". Likewise, gussets 23, 24 are joined at the respective corners where the left rear pillar 8 and the right rear pillar 9 respectively meet the floor frame 2 at substantially right angles. These gussets 21 to 24 are substantially the same in shape and each constructed from a relatively-thick, plate-like material. As a representative of these gussets, the gusset 22 between the right rear pillar 9 and the rear lateral beam member 15 will be described. As illustrated in FIG. 3, the gusset 22 has an angular portion 22c defined by two sides 22a, 22b that meet at substantially right angles; a rear lateral beam member side end 22d that is integral with the angular portion 22c and projects away from the right rear pillar 9; and a right rear pillar side end 22e that is integral with the angular portion 22c and projects away from the rear lateral beam member 15. As illustrated in FIG. 4(a), the edge of the side 22a located on the side of the rear lateral beam member 15 is fixed by welding to the widthwise middle part of a lower wall plate 15a of the rear lateral beam member 15. As illustrated in FIG. 4(c), the edge of the side 22b located on the side of the right rear pillar 9 is fixed by welding to the widthwise middle part of a left wall plate 9a of the right rear pillar 9.

As illustrated in FIG. 3, a gusset retaining member 31 for sustaining a load from the gusset 22 side is provided within the rear lateral beam member 15. The gusset retaining member 31 is composed of a plate-like member disposed on a position corresponding to the rear lateral beam member side end 22d of the gusset 22, for blocking up the inside of the rear lateral beam member 15. This gusset retaining member 31 is inserted through an insertion hole 41 provided in a front wall plate 15b of the rear lateral beam member 15 and joined by welding to the front wall plate 15b at the portion thereof outwardly projecting from the front wall plate 15b as illustrated in FIGS. 4(a), 4(b), so that the gusset retaining member 31 is secured to the rear lateral beam member 15. A gusset retaining member 31' similar to the gusset retaining member 31 is provided within the rear lateral beam member 15, in relation to a rear lateral beam member side end 21d of the gusset 21 (see FIG. 2).

As illustrated in FIG. 3, a gusset retaining member 32 for sustaining a load from the gusset 22 side is provided within the right rear pillar 9. The gusset retaining member 32 is composed of a plate-like member that is disposed on a position corresponding to a right rear pillar side end 22e of the gusset 22, for blocking up the inside of the right rear pillar 9. This gusset retaining member 32 is inserted through an insertion hole 42 provided in a front wall plate 9b of the right rear pillar 9 and joined by welding to the front wall plate 9b at the portion thereof outwardly projecting from the front wall plate 9b as illustrated in FIGS. 4(c), 4(d), so that the gusset retaining member 32 is secured to the right rear pillar 9. A gusset retaining member 32' similar to the gusset retaining member 32 is provided within the left rear pillar 8 in relation to a left rear pillar side end 21e of the gusset 21 (see FIG. 2).

In addition, as illustrated in FIG. 5, a gusset retaining member 33 for sustaining a load from the gusset 24 side is provided within a right rear pillar 9. The gusset retaining member 33 is composed of a plate-like member that is disposed on a position corresponding to a right rear pillar side end 24e of the gusset 24, for blocking up the inside of the right rear pillar 9. This gusset retaining member 33 is inserted through an insertion hole 43 provided in the front wall plate 9b of the right rear pillar 9 and joined by welding to the front wall plate 9b at the portion thereof outwardly projecting from the front wall plate 9b, so that the gusset retaining member 33 is secured to the right rear pillar 9. A gusset retaining member 33' similar to the gusset retaining member 33 is provided within the left rear pillar 8 in relation to a left rear pillar side end 23e of the gusset 23 (see FIG. 2).

In the cab 1 having the above structure, if a lateral load F is imposed on the top part of the cab body 3 from the left side as shown in FIG. 2, the left rear pillar 8 will tilt to the right and the right rear pillar 9 will be pushed by the rear lateral beam member 15, tilting to the right, so that there will occur a deformation that reduces the angle between the rear lateral beam member 15 and the right rear pillar 9 and a deformation that reduces the angle between the floor frame 2 and the left rear pillar 8. At that time, the gussets 22, 23 function as a chief reinforcement member for restraining the deformations. On the other hand, if a lateral load F' is imposed on the top part of the cab body 3 from the right side, the right rear pillar 9 will tilt to the left and the left rear pillar 8 will be pushed by the rear lateral beam member 15, tilting to the left, so that there will occur a deformation that reduces the angle between the rear lateral beam member 15 and the left rear pillar 8 and a deformation that reduces the angle between the floor frame 2 and the right rear pillar 9. At that time, the gussets 21, 24 function as a chief reinforcement member for restraining the deformations.

The imposing of the lateral load F on the top part of the cab body 3 from the left side consequently causes, as shown in FIG. 2, (a) a load $f_1$ acting on the rear lateral beam member 15 from the gusset 22 side so as to crush it; (b) a load $f_2$ acting on the right rear pillar 9 from the gusset 22 side so as to crush it; and (c) a load $f_3$ acting on the left rear pillar 8 from the gusset 23 side so as to crush it. The load $f_1$ concentrates in the position of the rear lateral beam member 15 that corresponds to the rear lateral beam member side end 22d of the gusset 22; the load $f_2$ concentrates in the position of the right rear pillar 9 that corresponds to the right rear pillar side end 22e of the gusset 22; and the load $f_3$ concentrates in a position of the left rear pillar 8 that corresponds to the left rear pillar side end 23e of the gusset 23.

The imposing of the lateral load F' on the top part of the cab body 3 from the right side consequently causes, as shown in FIG. 2, (d) a load $f_4$ acting on the rear lateral beam member 15 from the gusset 21 side so as to crush it; (e) a load $f_5$ acting on the left rear pillar 8 from the gusset 21 side so as to crush it; and (f) a load $f_6$ acting on the right rear pillar 9 from the gusset 24 side so as to crush it. The load $f_4$ concentrates in a position of the rear lateral beam member 15 that corresponds to the rear lateral beam member side end 21d of the gusset 21; the load $f_5$ concentrates in a position of the left rear pillar 8 that corresponds to the left rear pillar side end 21e of the gusset 21; and the load $f_6$ concentrates in the position of the right rear pillar 9 that corresponds to the right rear pillar side end 24e of the gusset 24.

According to the cab reinforcement structure of this embodiment, since the concentrated loads $f_1$, $f_2$, $f_3$, which have been caused by the lateral load F, are securely received by the gusset retaining members 31, 32, 33' respectively, thrust of the gusset 22 into the rear lateral beam member 15, thrust of the gusset 22 into the right rear pillar 9 and thrust of the gusset 23 into the left rear pillar 8 can be respectively prevented without fail. In addition, since the concentrated loads $f_4$, $f_5$, $f_6$, which have been caused by the lateral load F', are securely received by the gusset retaining members 31', 32', 33 respectively, thrust of the gusset 21 into the rear lateral beam member 15, thrust of the gusset 21 into the left rear pillar 8 and thrust of the gusset 24 into the right rear pillar 9 can be respectively prevented without fail. Accordingly, in the event that the lateral load F is imposed from the left or the lateral load F' is imposed from the right, the satisfactory reinforcement effect of the gussets 21 to 24 can be obtained and thus, the strength of the cab 1 can be increased by the gussets 21 to 24 without fail.

Modifications 1, 2 of the First Embodiment

FIG. 6(a) is an explanatory view of Modification 1 of the first embodiment and FIG. 6(b) is an explanatory view of Modification 2 of the first embodiment.

In Modification 1 shown in FIG. 6(a), the gusset retaining member 31 is substantially midway between a side 22b of the gusset 22 on the side of the rear pillar 9 and a rear lateral beam member side end 22f of the gusset 22. In Modification 2 shown in FIG. 6(b), the gusset retaining member 31 is disposed in relation to the vicinity of the rear lateral beam member side end 22f of the gusset 22. Although the location of the gusset retaining member 31 corresponding to the rear lateral beam member side end 22d of the gusset 22 is the most effective arrangement for preventing the thrust of the gusset 22 into the rear lateral beam member 15, the thrust of the gusset 22 into the rear lateral beam member 15 can be prevented to a certain degree with the arrangements as shown in Modifications 1, 2. It is obvious that the intent of Modifications 1, 2 can be also applied to the gusset retaining members 31', 32, 32', 33, 33'.

Second to fourth embodiments will be hereinafter described in order as other forms of the cab reinforcement structure of the invention. In the following second to fourth embodiments, the cab reinforcement structure of the invention will be discussed mainly in terms of the gusset retaining member that is provided within the rear lateral beam member 15, for sustaining the load from the gusset 22. Note that the gist of the following description is applicable to other gusset retaining members than the gusset retaining member disposed within the rear lateral beam member 15 in relation to the gusset 22.

Second Embodiment

FIG. 7 shows explanatory views of a cab reinforcement structure according to a second embodiment of the invention. In the second embodiment, the parts that are substantially equivalent or function similarly to the first embodiment are identified by the same reference numerals as in the first embodiment and a detailed explanation thereof is omitted herein. In the following description, the points different from the first embodiment will be mainly explained (the same applies to the third and fourth embodiments described later).

In the second embodiment, a gusset retaining member 51 as shown in FIG. 7 is used in the place of the gusset retaining member 31 of the first embodiment. In FIG. 7, the gusset retaining member 51 provided within the rear lateral beam member 15, for sustaining the load from the gusset side 22 is a plate-like member that is disposed at the position corresponding to the rear lateral beam member side end 22d of the gusset 22 so as to extend in a direction perpendicular to the longitudinal direction of the rear lateral beam member 15. The gusset retaining member 51 is in contact with the underside of the lower wall plate 15a of the rear lateral beam member 15 to which the gusset 22 is welded, while being distant from an upper wall plate 15c opposed to the lower wall plate 15a with a specified spacing S left therebetween. The gusset retaining member 51 is fixed to the rear lateral beam member 15, by inserting it through an insertion hole 44 provided in the front wall plate 15b of the rear lateral beam member 15 and joining the portion thereof projecting outwardly from the front wall plate 15b to the front wall plate 15b by welding. In the second embodiment, if a load is imposed on the rear lateral beam member 15 from the gusset 22 side so as to crush the rear lateral beam member 15, thrust of the gusset 22 into the rear lateral beam member 15 is allowed until the spacing S gives out. After the spacing S disappears and the gusset retaining member 51 is brought into contact with the upper wall plate 15c, the thrust of the gusset 22 into the rear lateral beam member 15 stops. Herein, the spacing S is properly set so as to satisfy the condition that when the gusset retaining member 51 comes into contact with the upper wall plate 15c, DLV (deflection-limiting-volume) is reserved. It should be noted that DLV means the volume of a box-like volume space approximate to the space occupied by an operator who is a well-built man sitting on an operator's seat within a cab and wearing ordinary work clothing and helmet (Japanese Industrial Standards A8910).

Third Embodiment

Figure 8A:
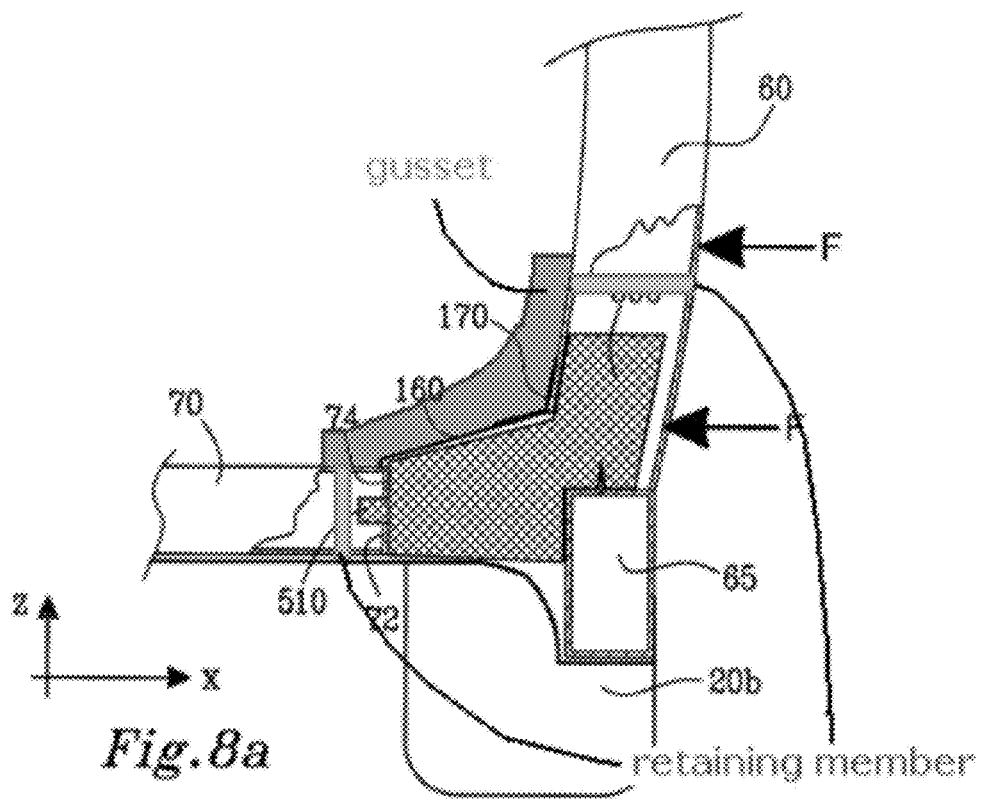
FIG. 8(a) is a partly broken enlarged view of the upper right corner of a cab as viewed from the rear face side thereof and FIG. 8(b) is a sectional view taken along line L-L of FIG. 8(a).
Figure 8B:
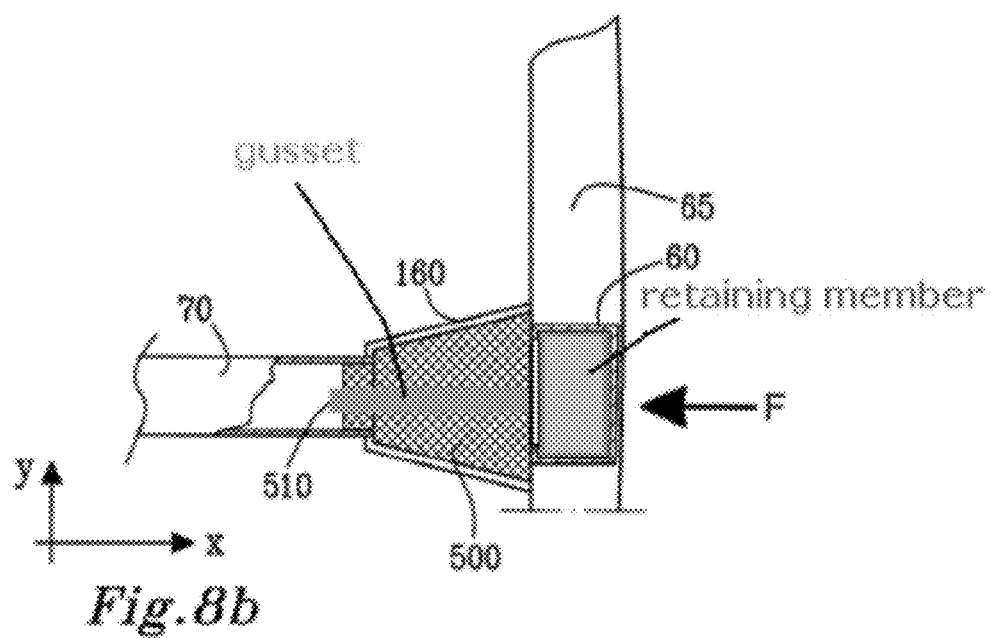

FIG. 8 shows explanatory views of a cab reinforcement structure according to a third embodiment of the invention.

In the third embodiment, a gusset with a gusset retaining member 55 as shown in FIG. 8 is used in the place of the gusset 22 and gusset retaining member 31 of the first embodiment. The gusset with a gusset retaining member 55 is composed of a gusset 22A and a gusset retaining member 56 which are formed as a single piece. The gusset 22A has the same shape as of the gusset 22 of the first embodiment, whereas the gusset retaining member 56 is disposed within the rear lateral beam member 15, for sustaining a load from the gusset 22A side. The gusset retaining member 56 stated herein is a plate-like member that is disposed at the position corresponding to the rear lateral beam member side end 22d of the gusset 22A so as to extend along the longitudinal direction of the rear lateral beam member 15. The gusset retaining member 56 passes through the lower wall plate 15a of the rear lateral beam member 15 to which the gusset 22A is welded, while being in abutting contact with the upper wall plate 15c opposed to the lower wall plate 15a. In the third embodiment, when a load is imposed on the rear lateral beam member 15 from the gusset 22A side so as to crush the rear lateral beam member 15, the load is securely received by the gusset retaining member 56 so that the thrust of the gusset 22A into the rear lateral beam member 15 can be prevented without fail.

Modification of Third Embodiment

FIG. 9 shows explanatory views of a modification of the third embodiment.

While the gusset with a gusset retaining member 55 of the third embodiment is equipped with the gusset retaining member 56 that passes through only the lower wall plate 15a of the rear lateral beam member 15, this modification provides a gusset with a gusset retaining member 55A in which a gusset retaining member 56A passes through both the lower wall plate 15a and upper wall plate 15c of the rear lateral beam member 15. It should be noted that the portion of the gusset retaining member 56A projecting outwardly from the upper wall plate 15c of the rear lateral beam member 15 is welded to the upper wall plate 15c. This modification has the same effect as of the third embodiment.

Fourth Embodiment

FIG. 10 shows explanatory views of a cab reinforcement structure according to a fourth embodiment of the invention.

In the fourth embodiment, a gusset retaining member 61 as shown in FIG. 10 is used in the place of the gusset retaining member 31 of the first embodiment. In FIG. 10, the gusset retaining member 61 provided within the rear lateral beam member 15, for sustaining a load from the gusset 22 is a pipe-like member that is disposed in relation to a zone between a position near the side 22b of the gusset 22 on the side of the right rear pillar 9 and a position in the vicinity of the rear lateral beam member side end 22f of the gusset 22. The gusset retaining member 61 is tightly fitted in the rear lateral beam member 15. The end face of the gusset retaining member 61, which is located on the side of the right rear pillar 9, is joined to the rear lateral beam member 15 by fillet welding and its side faces are joined to the rear lateral beam member 15 by plug welding, whereby the gusset retaining member 61 is fixed to the rear lateral beam member 15. According to the fourth embodiment, if a load is imposed on the rear lateral beam member 15 from the gusset 22 side so as to crush the rear lateral beam member 15, the load is securely received by the gusset retaining member 61 so that the thrust of the gusset 22 into the lateral beam member 15 can be prevented without fail.

Fifth Embodiment

Figure 11:
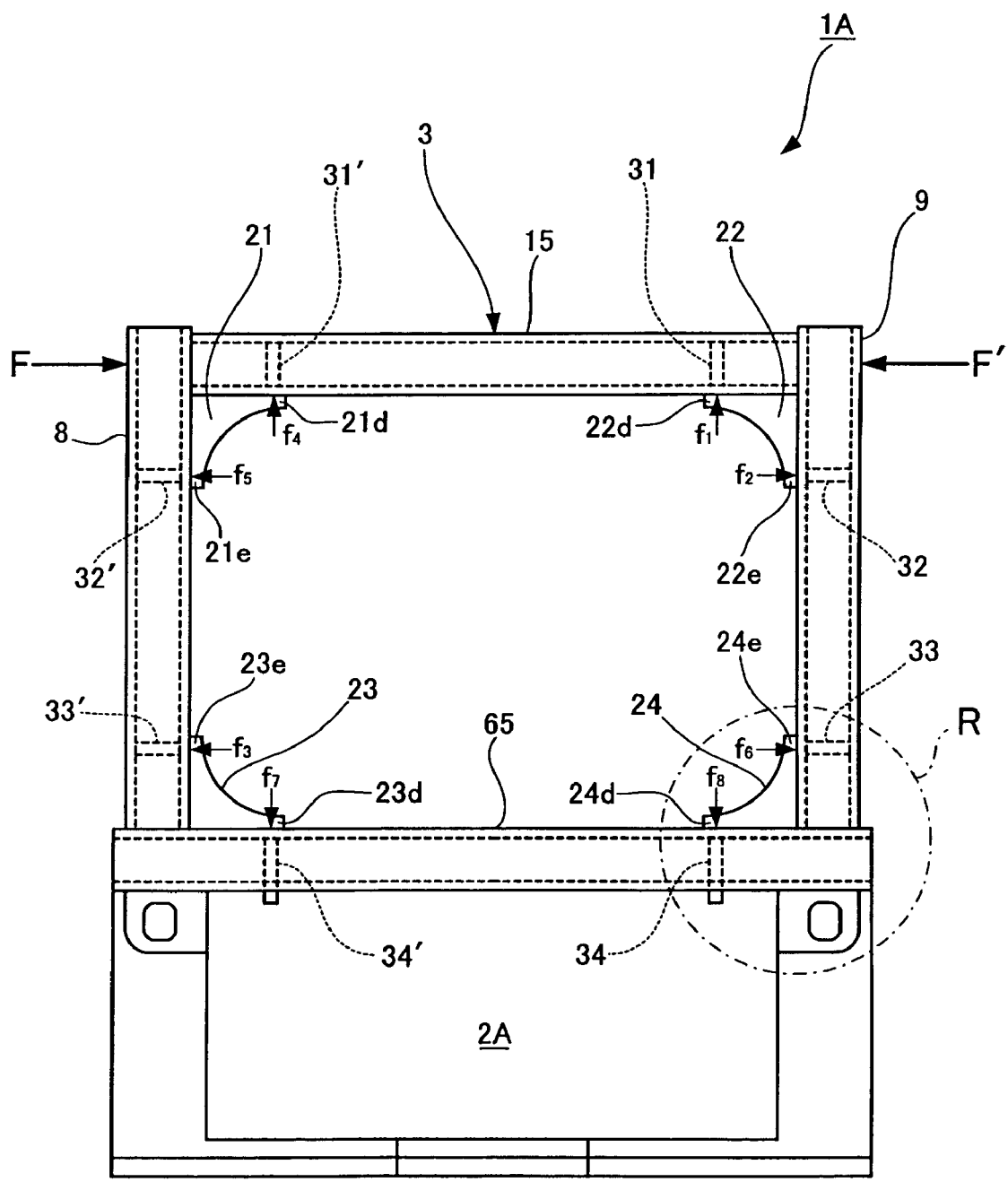
FIG. 11 is a rear view of a cab that has a cab reinforcement structure according to a fifth embodiment of the invention.

FIG. 11 is a rear view of a cab that has a cab reinforcement structure according to a fifth embodiment of the invention. In the fifth embodiment, the parts that are substantially equivalent or function similarly to the first embodiment are identified by the same reference numerals as in the first embodiment and a detailed explanation thereof is omitted herein. In the following description, the points different from the first embodiment will be mainly explained.

In a cab 1A according to the fifth embodiment, the upper peripheral part of a floor frame 2A is constituted by right and left longitudinal members (not shown) and a rear lateral member 65, each member consisting of a pipe member. The floor frame 2A has a sheet-metal box structure that is similar to that of the floor frame 2 of the first embodiment except the above point. The left rear pillar 8 and the right rear pillar 9 stand upright on the left end and right end, respectively, of the rear lateral member 65. A gusset 23 is joined to the corner at which the left rear pillar 8 and the rear lateral member 65 meet at substantially right angles whereas a gusset 24 is joined to the corner at which the right rear pillar 9 and the rear lateral member 65 meet at substantially right angles.

Figure 12:
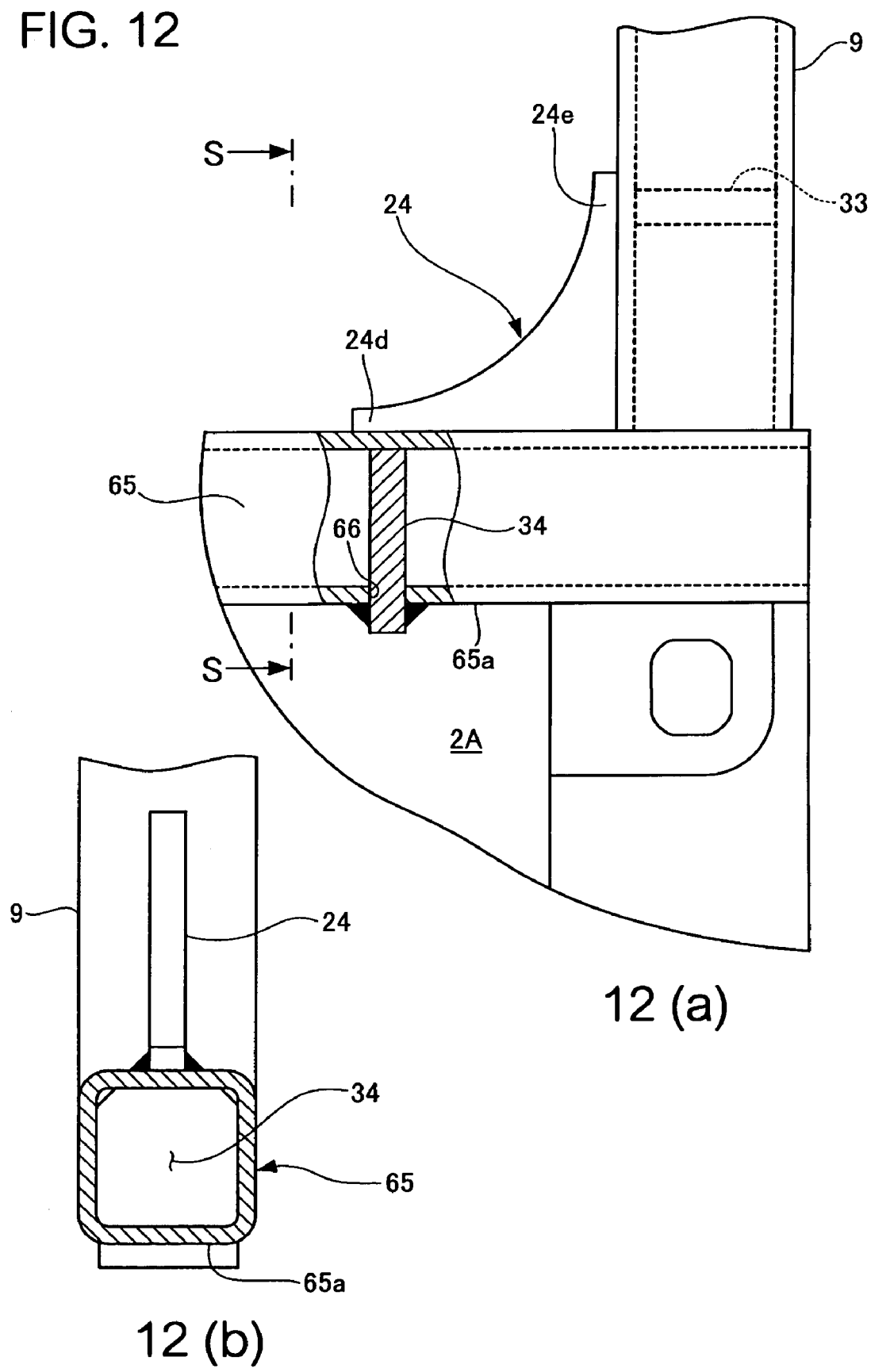
FIG. 12(a) is a partly broken enlarged view showing Part R of FIG. 11
FIG. 12(b) is a sectional view taken along line S-S of FIG. 12(a).

Formed within the rear lateral member 65 is a gusset retaining member 34 for sustaining a load from the gusset 24 side. The gusset retaining member 34 is a plate-like member disposed in relation to a rear lateral member side end 24d of the gusset 24, for blocking up the inside of the rear lateral member 65. As illustrated in FIGS. 12(a), 12(b), the gusset retaining member 34 is inserted through an insertion hole 66 provided in a lower wall plate 65a of the rear lateral member 65 and joined to the lower wall plate 65a by welding at the portion thereof projecting outwardly from the lower wall plate 65a, whereby the gusset retaining member 34 is secured to the rear lateral member 65. Within the rear lateral member 65, a gusset retaining member 34' similar to the gusset retaining member 34 is disposed in relation to a rear lateral member side end 23d of the gusset 23 (see FIG. 11).

In the cab 1A of the fifth embodiment, if the lateral load F is imposed on the top part of the cab body 3 from the left side as shown in FIG. 11, the left rear pillar 8 will tilt to the right and the right rear pillar 9 will be pushed by the rear lateral beam member 15, tilting to the right, so that there will occur a deformation that reduces the angle between the rear lateral beam member 15 and the right rear pillar 9 and a deformation that reduces the angle between the rear lateral member 65 of the floor frame 2A and the left rear pillar 8. At that time, the gussets 22, 23 function as a chief reinforcement member for restraining the deformations. On the other hand, if a lateral load F' is imposed on the top part of the cab body 3 from the right side, the right rear pillar 9 will tilt to the left and the left rear pillar 8 will be pushed by the rear lateral beam member 15, tilting to the left, so that there will occur a deformation that reduces the angle between the rear lateral beam member 15 and the left rear pillar 8 and a deformation that reduces the angle between the rear lateral member 65 of the floor frame 2A and the right rear pillar 9. At that time, the gussets 21, 24 function as a chief reinforcement member for restraining the deformations.

The imposing of the lateral load F on the top of the cab body 3 from the left side consequently causes (a) a load $f_1$ acting on the rear lateral beam member 15 from the gusset 22 side so as to crush it; (b) a load $f_2$ acting on the right rear pillar 9 from the gusset 22 side so as to crush it; (c) a load $f_3$ acting on the left rear pillar 8 from the gusset 23 side so as to crush it; and (d) a load $f_7$ acting on the rear lateral member 65 from the gusset 23 side so as to crush it, as shown in FIG. 11. The load $f_1$ concentrates in the position of the rear lateral beam member 15 that corresponds to the rear lateral beam member side end 22d of the gusset 22; the load $f_2$ concentrates in the position of the right rear pillar 9 that corresponds to the right rear pillar side end 22e of the gusset 22; the load $f_3$ concentrates in a position of the left rear pillar 8 that corresponds to the left rear pillar side end 23e of the gusset 23; and the load $f_7$ concentrates in a position of the rear lateral member 65 that corresponds to the rear lateral member side end 23d of the gusset 23.

The imposing of the lateral load F' on the top part of the cab body 3 from the right side consequently causes (e) a load $f_4$ acting on the rear lateral beam member 15 from the gusset 21 side so as to crush it; (f) a load $f_5$ acting on the left rear pillar 8 from the gusset 21 side so as to crush it; (g) a load $f_6$ acting on the right rear pillar 9 from the gusset 24 side so as to crush it; and (h) a load $f_8$ acting on the rear lateral member 65 from the gusset 24 side so as to crush it, as shown in FIG. 11. The load $f_4$ concentrates in the position of the rear lateral beam member 15 that corresponds to the rear lateral beam member side end 21d of the gusset 21; the load $f_5$ concentrates in the position of the left rear pillar 8 that corresponds to the left rear pillar side end 21e of the gusset 21; the load $f_6$ concentrates in the position of the right rear pillar 9 that corresponds to the right rear pillar side end 24e of the gusset 24; and the load $f_8$ concentrates in a position of the rear lateral member 65 that corresponds to the rear lateral member side end 24d of the gusset 24.

According to the cab reinforcement structure of this embodiment, since the concentrated loads $f_1$, $f_2$, $f_3$, $f_7$, which have been caused by the lateral load F, are securely received by the gusset retaining members 31, 32, 33', 34' respectively, thrust of the gusset 22 into the rear lateral beam member 15, thrust of the gusset 22 into the right rear pillar 9, thrust of the gusset 23 into the left rear pillar 8, and thrust of the gusset 23 into the rear lateral member 65 can be respectively prevented without fail. In addition, since the concentrated loads $f_4$, $f_5$, $f_6$, $f_8$, which have been caused by the lateral load F', are securely received by the gusset retaining members 31', 32', 33, 34 respectively, thrust of the gusset 21 into the lateral beam member 15, thrust of the gusset 21 into the left rear pillar 8, thrust of the gusset 24 into the right rear pillar 9 and thrust of the gusset 24 into the rear lateral member 65 can be respectively prevented without fail. Accordingly, in the event that the lateral load F is imposed from the left or the lateral load F' is imposed from the right, the satisfactory reinforcement effect of the gussets 21 to 24 can be obtained and thus, the strength of the cab 1A can be increased by the gussets 21 to 24 without fail.

Figure 13:
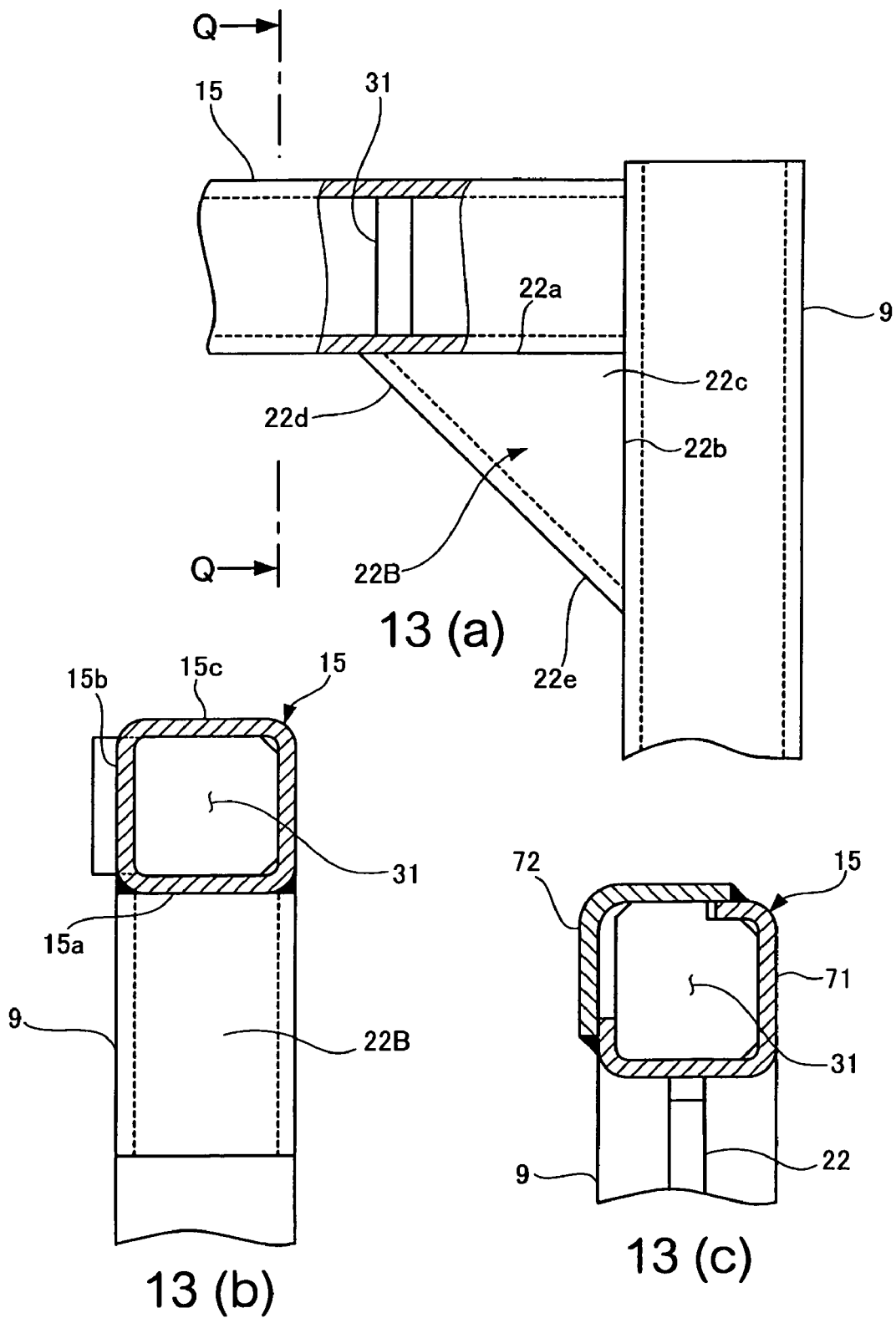
FIGS. 13(a), 13(b) show explanatory views of another form of a gusset.
FIG. 13(c) is an explanatory view of another form of a rear lateral beam member.

Although the forgoing embodiments have been presented in terms of the gusset 22 (representative of all the gussets) constituted by a relatively thick plate-like material, the invention is not necessarily limited to this and the gusset 22 may, of course, be replaced by a gusset 22B having a sheet-metal flexure structure such as shown in FIGS. 13(a), 13(b). In addition, while the left rear pillar 8, the right rear pillar 9, the rear lateral beam member 15 and the rear lateral member 65 are respectively constituted by a single-piece pipe member in the foregoing embodiments, the invention is not necessarily limited to this and a pipe member composed of two pipe component pieces 71, 72 integrally welded to each other such as shown in FIG. 13(c) may be used instead for forming the left rear pillar 8, the right rear pillar 9, the rear lateral beam member 15 and the rear lateral member 65. Taking a case where the rear lateral beam member 15 is composed of such a pipe member for example, the gusset retaining member 31 is welded to the first pipe component piece 71 beforehand, and then, the second pipe component piece 72 is welded to the first pipe component piece 71, thereby incorporating the gusset retaining member 31 into the rear lateral beam member 15.

Although the gusset retaining member of the invention is applied to the gussets 21, 22 between the rear pillars 8, 9 and the rear lateral beam member 15 and the gusset 23, 24 between the rear pillars 8, 9 and the floor frames 2, 2A in the foregoing embodiments, it is readily apparent that the gusset retaining member of the invention can be applied to the following gussets (1) to (8).

(1) Gussets provided between the beam member 14 and the center pillars 6 and 7, respectively.

(2) Gussets provided between the center pillars 6, 7 and the floor frames 2, 2A, respectively.

(3) Gussets provided between the beam member 13 and the front pillars 4, 5, respectively.

(4) Gussets provided between the front pillars 4, 5 and the floor frames 2, 2A, respectively.

(5) Gussets provided between the rear pillars 8, 9 and the beam members 11, 12, respectively.

(6) Gussets provided between the center pillars 6, 7 and the beam members 11, 12, respectively.

(7) Gussets provided between the center pillars 6, 7 and the beam members 16, 17, respectively.

(8) Gussets provided between the front pillars 4, 5 and the beam members 16, 17, respectively.

Although the cab reinforcement structure of the invention and the work machine cab having the reinforcement structure of the invention have been described according to a plurality of embodiments and modifications, it is apparent that the invention is not necessarily limited to the particular embodiments/modifications shown herein and various changes can be made to the disclosed embodiments without departing from the spirit and scope of the invention (for instance, various combinations of the elements discussed in the foregoing embodiments/modifications are possible).

The invention claimed is:

1. A cab reinforcement structure for reinforcing a cab including a support column member and a beam member joined to the support column member, the cab reinforcement structure comprising:
    a gusset arranged external to the support column member and the beam member at a corner at which the support column member and the beam member meet each other in order to externally support the corner,
    a first gusset retaining member that is disposed within the beam member in relation to the gusset, for sustaining a load from a gusset side, and
    a second gusset retaining member that is disposed within the support column member in relation to the gusset, for sustaining a load from the gusset side,
    wherein the first gusset retaining member and the second gusset retaining member are separate elements from the gusset, and
    wherein the gusset includes an angular portion defined by sides, a beam member side-end portion that is integral with the angular portion and that projects away from the support column member, and a support column member side-end portion that is integral with the angular portion and that projects away from the beam member, and
    wherein the first gusset retaining member comprises a plate-like member that is in contact with all inner surfaces of the beam member and completely blocks up a cross-section of an interior of the beam member at a position corresponding to the beam member side-end of the gusset, and
    wherein the second gusset retaining member comprises a plate-like member that is in contact with all inner surfaces of the support column member and completely blocks up a cross-section of an interior of the support column member at a position corresponding to the support column member side-end of the gusset.

2. The cab reinforcement structure according to claim 1, wherein the first gusset retaining member is inserted through an insertion hole provided in a front wall plate of the beam member and joined by welding to the front wall plate at the portion thereof outwardly projecting from the front wall plate, and
    wherein the second gusset retaining member is inserted through an insertion hole provided in a front wall plate of the support column member and joined by welding to the front wall plate at the portion thereof outwardly projecting from the front wall plate.

3. The cab reinforcement structure according to claim 1, wherein said support column member is a left or right rear pillar that stands upright on a rear end of a floor frame and said beam member is a rear lateral beam member that connects upper ends of the left and right rear pillars.

* * * * *